May 7, 1929. H. HEILBORN 1,711,846
FILING DEVICE FOR DENTAL PURPOSES
Filed Feb. 17, 1928
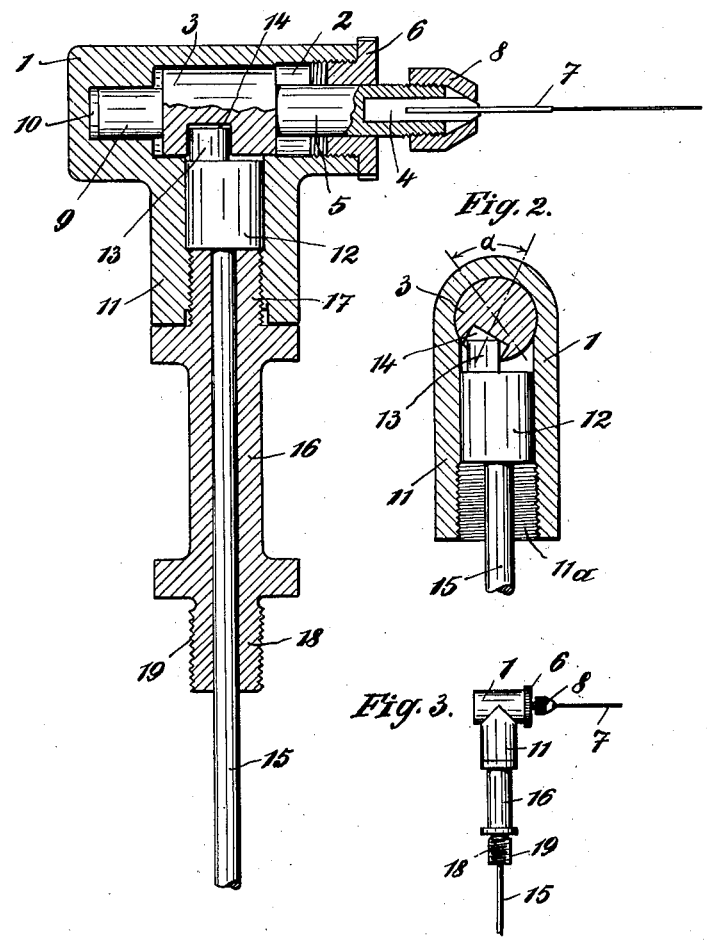
Inventor
HERMANN HEILBORN Patented May 7, 1929.

1,711,846

UNITED STATES PATENT OFFICE.

HERMANN HEILBORN, OF BERLIN, GERMANY.

FILING DEVICE FOR DENTAL PURPOSES.

Application filed February 17, 1928, Serial No. 255,059, and in Germany December 13, 1926.

This invention relates to a filing device for the tooth root passages, which device is adapted to be driven mechanically.

The present invention consists therein that the driving shaft mounted in the handle portion of an angular member is kinematically coupled to the shaft of the file holder in the cross head and which moves to and fro in such a manner that on the rotation of the driving shaft the file holder shaft is caused to move positively both to and fro about its longitudinal middle axis and to and fro in the direction of this axis. For this purpose the file holder which is of circular cylindrical shape and is guided in a suitable hollow bearing of the cross head, is provided with a boring of which the axis is directed at right angles to the longitudinal axis of the file holder and with which engages the crank pin at the end of the driving shaft.

An essential advantage obtained by the present invention consists in an extremely simple and therefore inexpensive construction.

An example of construction of the subject of the invention is illustrated in the accompanying drawing wherein:—

Figure 1 shows a longitudinal section of the filing device to an enlarged scale.

Figure 2 shows a cross section of the filing device after the crank disc has been turned through 90° relatively to the position shown in Figure 1.

Figure 3 is a complete view of the filing device.

In the drawings 1 indicates the casing of the device in the upper part of which is provided a boring 2 in which is guided the file holder 3. The file holder 3 is provided at its front end with a supporting pin 5, serving for the reception of the clamping member 4, which is itself guided by a bush 6 screwed into the front end of the boring 2 of the casing. For securing the file 7 to the file holder 3 the latter is fitted into the clamping member and rigidly connected to the clamping member 4 and the supporting pin 5 of the file holder 3 by means of the clamping nut 8. At its rear end the file holder 3 is provided with a guide pin 9 resting in a boring 10 of the casing 1. At right angles to the axis of the boring 2 and the file holder 3 the casing has an extension 11 provided in the interior with a boring 11ª serving as a guide for the crank disc 12.

The crank disc 12 is provided with the crank pin 13 engaging with a boring 14 of the file holder 3. To the crank disc 12 is secured a rod 15 which may be connected to the shaft of the drilling machine in any suitable manner. In order to prevent axial movements of the rod 15 and of the crank disc 12 there is screwed into the lower portion of the boring 11ª the upper end 17 of a guide sleeve 16. The sleeve 16 is provided with a longitudinal bore through which passes the rod 15. At its lower end 18 the guide sleeve 16 is also provided with a screw thread 19 by means of which it can be connected to the casing of the flexible shaft of the drilling machine.

The operation of the subject of the invention is as follows:

As soon as the rod 15 and therewith the crank disc 12 and the crank pin 13 are rotated by the shaft of the drilling machine the file holder 3 which is guided in the casing 1 at right angles to the axis of the crank, is moved in the longitudinal direction by the crank 13, being reciprocated axially to a distance equal to the length of the diameter of the crank. As however the crank 13 does not carry out a reciprocating movement in a straight line but describes a circle, the components of the movement of the crank, which is located at right angles to the file holder, cause the file holder to carry out a reciprocating rotary movement about its axis at the same time as it carries out a reciprocating movement. These conditions are clearly shown in Figure 2 in which the dotted lines indicate the position which the file holder assumes after the crank has been rotated through 180°. When the crank disc has made a complete revolution there will be imparted to the file holder simultaneously with the reciprocating axial movement a reciprocating rotary movement through an angle α.

The filing devices are particularly suitable for application where an angular head is provided and in which it is desired to guide the file at an angle to the handle.

I claim:

1. A filing device for tooth root passages comprising a head of an angle piece, a circular hollow bearing in said cross head open at one end, a detachable closure at said open end of said cross head, a circular boring in said closure, another circular boring in said cross head being a continuation of said hollow bearing and having a smaller diameter than said hollow bearing, a circular file holder in said hollow bearing, circular projections on both sides of said file holder engaging with said continuation boring and said boring in said closure, a boring vertical to the axis of said file holder in said file holder, an extension on said cross head, a boring in said extension, a sleeve screwed into said boring of said extension, a driven shaft in said sleeve, a crank disc at the end of said shaft and arranged in said boring of said extension and a crank pin on said crank disc and engaging with said boring in said file holder.

2. A filing device for tooth root passages comprising a casing having bores therein substantially at right angles to each other, a drive shaft mounted in one of said bores, a crank pin on the end of said drive shaft, and a file holder having a bore therein substantially at right angles to its longitudinal axis slidably and rotatably mounted in the other of said bores, said crank pin being adapted to engage the bore in the file holder so as to impart both reciprocatory and oscillatory motion to the file holder upon rotation of the drive shaft.

3. A filing device for tooth root passages comprising a casing having bores therein substantially at right angles to each other, a drive shaft mounted in one of said bores, a crank pin on the end of said drive shaft, and a file holder having a bore therein substantially at right angles to its longitudinal axis slidably and rotatably mounted in the other of said bores, said bore in the file holder being of greater diameter than the diameter of the crank pin, the crank pin being adapted to engage the bore in the file holder so as to impart both reciprocatory and oscillatory motion to the file holder upon rotation of the drive shaft.

In testimony whereof I affix my signature.

HERMANN HEILBORN.